United States Patent
Nahler et al.

(10) Patent No.: US 12,529,772 B2
(45) Date of Patent: Jan. 20, 2026

(54) TIME-OF-FLIGHT IMAGING SYSTEM AND METHOD AND COMPUTER PROGRAM FOR OPERATING A TIME-OF-FLIGHT IMAGING SYSTEM

(71) Applicant: Infineon Technologies AG, Neubiberg (DE)

(72) Inventors: Caterina Nahler, Thondorf (AT); Hannes Plank, Graz (AT); Armin Josef Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 968 days.

(21) Appl. No.: 17/706,732

(22) Filed: Mar. 29, 2022

(65) Prior Publication Data

US 2022/0317270 A1    Oct. 6, 2022

(30) Foreign Application Priority Data

Mar. 31, 2021  (EP) ..................... 21166421

(51) Int. Cl.
*G01C 3/08* (2006.01)
*G01S 7/4912* (2020.01)
*G01S 7/4914* (2020.01)
*G01S 17/894* (2020.01)

(52) U.S. Cl.
CPC .......... *G01S 7/4917* (2013.01); *G01S 7/4914* (2013.01); *G01S 17/894* (2020.01)

(58) Field of Classification Search
CPC ..... G01S 7/4917; G01S 7/4914; G01S 17/894
See application file for complete search history.

(56) References Cited

U.S. PATENT DOCUMENTS

| | | | |
|---|---|---|---|
| 10,557,925 B2* | 2/2020 | Wang | G01S 17/10 |
| 11,624,834 B2* | 4/2023 | Park | G01S 7/4863 |
| | | | 356/5.01 |
| 2020/0304741 A1* | 9/2020 | Dielacher | G01S 7/4914 |
| 2021/0075980 A1* | 3/2021 | Lajevardi | H04N 23/11 |
| 2025/0089384 A1* | 3/2025 | Nakamura | H04N 25/77 |

FOREIGN PATENT DOCUMENTS

EP    3712650 A1    9/2020

\* cited by examiner

*Primary Examiner* — Mark Hellner
(74) *Attorney, Agent, or Firm* — Murphy, Bilak & Homiller, PLLC

(57) ABSTRACT

A time-of-flight (ToF) imaging system includes a photonic mixer device configured to perform ToF measurements using at least one photo-sensitive element. Each photo-sensitive element includes at least a first element with a modifiable first charge level, a second element with a modifiable second charge level, and a gate for transferring charges to a fixed potential. The ToF imaging system includes control circuitry configured to provide a control signal for the photonic mixer device. The control signal is configured to drive the at least one photo-sensitive element such that charge carriers generated in the at least one photo-sensitive element by received light are directed either to the first element, the second element or the gate, or such that charge carriers generated in the at least one photo-sensitive element by received light are directed either to the first element, the second element, the gate, or to the first and the second element.

15 Claims, 9 Drawing Sheets

TIME-OF-FLIGHT IMAGING SYSTEM AND METHOD AND COMPUTER PROGRAM FOR OPERATING A TIME-OF-FLIGHT IMAGING SYSTEM

TECHNICAL FIELD

Examples relate to a Time-of-Flight (ToF) imaging system, and to a method and computer program for operating a ToF imaging system.

BACKGROUND

Face recognition, which may be used to perform, or provide additional security for, a face authentication process being used to unlock smartphones, is a major application for ToF sensors. In some cases, the accuracy of the sensed depth can be impaired by interfering elements in the scene, such as reflective materials.

A cover glass, such as a smartphone display, can be such an interfering object. When the sensor is placed underneath the glass, the infrared light may be reflected by said glass and cause mixed measurement of the objects behind the in the scene and the glass.

There may be a desire for an improved concept for depth imaging behind a cover glass.

SUMMARY

Various examples relate to a ToF imaging system. The ToF imaging system comprises a photonic mixer device for performing ToF measurements using at least one photo-sensitive element. Each photo-sensitive element comprises at least a first element with a modifiable first charge level, a second element with a modifiable second charge level, and a gate for transferring charges to a fixed potential. The ToF imaging system comprises control circuitry configured to provide a control signal for the photonic mixer device. The control signal is configured to drive the at least one photo-sensitive element such that charge carriers generated in the photo-sensitive elements by received light are directed either to the first element, the second element or the gate, or such that charge carriers generated in the photo-sensitive elements by received light are directed either to the first element, the second element, the gate, or to the first and the second element.

Various examples relate to a method for operating a ToF imaging system. The ToF imaging system comprises a photonic mixer device for performing ToF measurements using at least one photo-sensitive element. Each photo-sensitive element comprises at least a first element with a modifiable first charge level, a second element with a modifiable second charge level, and a gate for transferring charges to a fixed potential. The method comprises providing a control signal for the photonic mixer device. The control signal is configured to drive the at least one photo-sensitive element such that charge carriers generated in the photo-sensitive elements by received light are directed either to the first element, the second element or the gate, or such that charge carriers generated in the photo-sensitive elements by received light are directed either to the first element, the second element, the gate, or to the first and the second element.

Various examples relate to a computer program product comprising a non-transitory computer readable medium storing a computer program for operating a time-of-flight (ToF) imaging system that includes a photonic mixer device configured to perform ToF measurements using at least one photo-sensitive element, each photo-sensitive element comprising at least a first element with a modifiable first charge level, a second element with a modifiable second charge level, and a gate configured to transfer charges to a fixed potential, the computer program comprising: program instructions to provide a control signal for the photonic mixer device, the control signal being configured to drive the at least one photo-sensitive element such that charge carriers generated in the at least one photo-sensitive element by received light are directed either to the first element, the second element or the gate, or such that charge carriers generated in the at least one photo-sensitive element by received light are directed either to the first element, the second element, the gate, or to the first and the second element.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
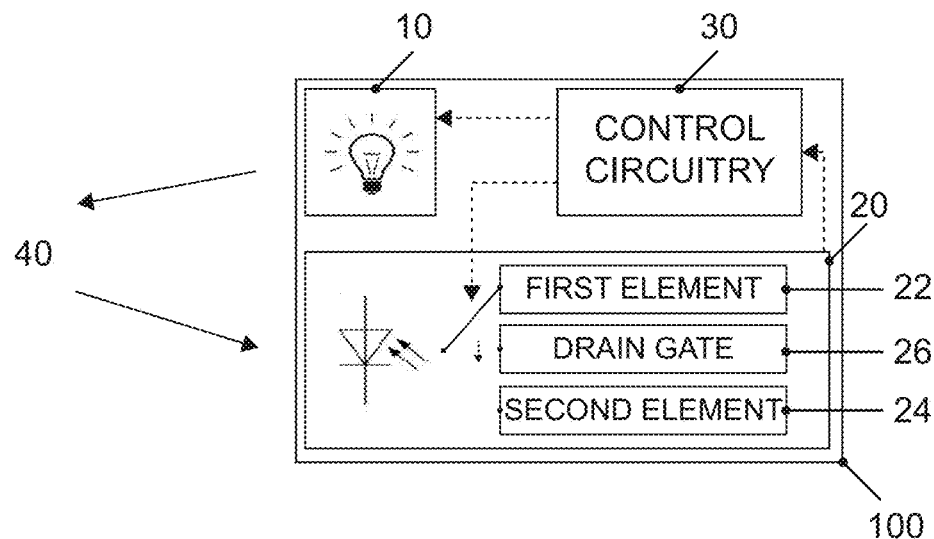
FIG. 1a shows a schematic diagram of an example of a ToF imaging system.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various aspects of the present disclosure relate to stray-light mitigation via a drain gate. In particular, the present disclosure relates to an (optical) Time-of-Flight (ToF) imaging system and to a corresponding method and computer program.

Optical ToF imaging systems operate by emitting light towards a scene using an illumination element of the ToF imaging system and measuring the time it takes for the light to be reflected to a sensor, which is implemented by a photonic mixer device, of the ToF imaging system. In many cases, e.g., in ToF imaging systems that use continuous-wave-modulated light, the time it takes for the light to be reflected is measured by determining a phase-delay between a phase of the light emitted by the illumination element and the light recorded by the sensor of the ToF imaging system.

FIG. 1a shows a schematic diagram of a ToF imaging system 100 according to an example. In the ToF imaging system 100 shown in FIG. 1a, the light being emitted towards the scene 40 is emitted by an illumination element 10, and the reflections are being measured using a photonic mixer device (PMD) 20. Both the illumination element 10 and the photonic mixer device 20 are controlled by control circuitry 30 of the ToF imaging system 100, which is coupled to the illumination element 10 and the photonic mixer device 20. In the ToF imaging system 100, the illumination element 10 and the photonic mixer device 20 are controlled by a control signal that is generated by the control circuitry 30, and that is used to control or drive the illumination element 10 and the photonic mixer device 20.

Thus, the ToF imaging system 100 shown in FIG. 1a comprises the illumination element 10 that is suitable for emitting light. The illumination element 10 may comprise any number of light sources. The illumination element 10 may, for example, comprise one or more Light-Emitting Diodes (LEDs) and/or one or more laser diodes (e.g., one or more Vertical-Cavity Surface-Emitting Lasers, VCSELs) which are fired as controlled by the proposed method and/or the control circuitry 30.

The ToF imaging system further comprises the photonic mixer device 20, which is suitable for performing ToF measurements using at least one photo-sensitive element. In the ToF imaging system 100, the photonic mixer device 20 is used to record the light that is reflected off one or more objects 40 of the scene. The at least one photo-sensitive element may be an element that is sensitive to light, configured to sense the light that is incident to the photo-sensitive element, by generating electrical charges in response to the received light. For example, the received light may comprise light that is reflected off the one or more objects 40 of the scene. For example, the photonic mixer device 20 may comprise a plurality of photo-sensitive elements, e.g., a two-dimensional array of photo-sensitive elements. For example, the photo-sensitive elements of the two-dimensional array of photo-sensitive elements may also be denoted "pixels" of the photonic mixer device.

The (or each) photo-sensitive element comprises at least a first element 22 with a modifiable first charge level, a second element 24 with a modifiable second charge level, and a gate 26 for transferring charges to a fixed potential. While the photonic mixer device 20 is described only with a first and a second element with modifiable charge levels, the same concept may be used for photonic mixer devices with a larger number of elements with modifiable charge levels (e.g., with four elements with modifiable charge levels).

When light is received by the photo-sensitive element, a charge carrier is generated. Depending on a state of the control signal being used to drive the photo-sensitive element, the charge carrier is directed towards the first element or the second element, which may be seen as logical "buckets" for collecting charges. For example, capacitors may be used to implement the first and second elements with modifiable charge levels.

In the ToF imaging sensor introduced in connection with the present disclosure, the charge carriers can be directed alternatively to a so-called "drain gate", which is the gate 26 for transferring charges to a fixed potential. In other words, each photo-sensitive element, or "pixel" may comprise a drain gate in addition to the first and second element. Thus, the photo-sensitive element now has a third terminal where the generated charge carriers can be directed to. In effect, when the charges are transferred to the drain gate, they are discarded and might not contribute to the charge levels of the elements with the modifiable charge levels. In contrast to the first and second element, the drain gate is not accumulating charges, but just directing them away to another potential (e.g., ground). Stray light, i.e., light that is to be disregarded in the generation of an output signal of the ToF imaging system, may thus be suppressed by directing the respective charges to the drain gate.

As mentioned above, the control circuitry 30 is used to control and drive the illumination element and the photonic mixer device 20. In general, the control circuitry may be configured to perform the method shown in connection with FIG. 1b, therefore, the functionality of the control circuitry is also shown with reference to the method of FIG. 1b.

Figure 1B:
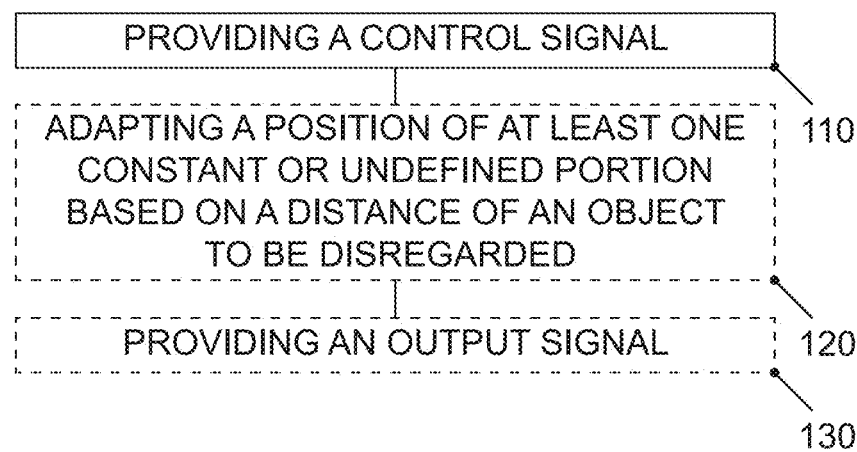
FIG. 1b shows a flow chart of an example of a method for operating a ToF imaging system.

FIG. 1b shows a flow chart of an example of a method for operating a ToF imaging system, such as the ToF imaging system 100 of FIG. 1a. The following description thus relates to the ToF imaging system 100 of FIG. 1a and to the method of FIG. 1b. Features introduced in connection with the ToF imaging system may likewise be applied to the ToF imaging system 100, and vice versa.

The method comprises providing 110 a control signal for the photonic mixer device. Accordingly, the control circuitry 30 is configured to provide the control signal for the photonic mixer device 20. With respect to the photonic mixer device 20, the control signal is configured to control which of the first element, the second element, and the gate the charges generated by the at least-one photo-sensitive element are directed to. In particular, the control signal is configured to drive the at least one photo-sensitive element such that charge carriers generated in the photo-sensitive elements by received light are directed either to the first element 22, the second element 24 or the gate 26, or such that charge carriers generated in the photo-sensitive elements by received light are directed either to the first element 22, the second element 24, the gate 26, or (equally) to the first and the second element. In some examples, the charge carriers may be directed either to the first element 22, or the second element 24, or to the gate 26. In some other examples, the charge carriers may be directed either to the first element 22, or the second element 24, or to the gate 26, or equally to the first element 22 and the second element 24. However, the last option, with the charges being directed equally to the first element 22 and the second element 24 may be optional. This option may be used to clear the photonic mixer device 20 of parasitic electrons. Thus, the circuitry may be configured to generate the control signal with one of three, or optionally four states. If the control signal for the photonic mixer device exhibits the first state, the charges may be directed (only) to the first element 22. If the control signal for the photonic mixer device exhibits the second state, the charges may be directed (only) to the second element 24. If the control signal for the photonic mixer device exhibits the third state, the charges may be directed (only) to the gate 26. Optionally, if the control signal for the photonic mixer device exhibits the fourth state, the charges may be directed equally to the first element 22 and to the second element 24. There are many ways how the photonic mixer device can be controlled to have an adjustable drain gate, so in this disclosure, so, in the context of the present disclosure, the control signal is only explained with regards to the state of the photo-sensitive element (of directing the charge carriers to the first element, the second element, or to the drain gate). The at least one photo-sensitive element is driven by the control signal and configured to direct the charges towards the first element 22, the second element 24, the gate 26, or equally to the first element 22 and the second element 24 according to the control signal.

The illumination element 10 is controlled as well, e.g., also based on a state of the control signal. In other words, the control signal may be configured to drive the photo-sensitive element (or photo-sensitive elements) of the photonic mixer device and to control the emissions of the illumination element. For example, the control signal may comprise a component for driving the photo-sensitive element and another component for controlling the illumination element. The control signal for the illumination element may define an activation or intensity of the illumination element.

In various examples, the control signal for the photonic mixer device 20 and for the illumination element 10 are generated according to sequences of states, with the states defining the effects the control signal has on the photonic mixer device 20 and on the illumination element 10. For example, the control circuitry may be configured to generate the control signal for the photonic mixer device according to a sequence of states for the photonic mixer device. For example, each state of the sequence of states for the photonic mixer device may define which of the first element, the second element, and the gate the charge carriers are directed to. For example, as outlined above, the control signal for the photonic mixer device may take one of three, or optionally four, states. Similarly, the control circuitry may be configured to generate the control signal for the illumination element according to a sequence of states for the illumination element. For example, each state of the sequence of states for the illumination element may define whether the illumination system is activated. Thus, the control signal for the illumination element may take one of two states (e.g., "activated" or "deactivated"). For example, the sequences of states may define the state the respective control signals exhibit at a given time of a measurement. In general, the sequences of state may be time-synchronized, such that the states of the control signal for the photonic mixer device and the states of the control signal for the illumination element have a fixed temporal relationship (if signal jitter is disregarded).

A combination of a sequence of states for the photonic mixer device and a sequence of states for the illumination element may define a correlation function of the ToF imaging system. In general, a correlation function of the ToF imaging system represents an expected distance-dependent output of the ToF imaging system, with the output being used to determine the phase-delay, and thus the distance. In ToF imaging systems without a drain gate, the correlation function represents how the generated charges are being directed to the different elements with modifiable charge levels. In the proposed ToF imaging system, the charges that are directed to the drain gate are taken into account as well, as the drained charges influence the correlation function and create ambiguity as different sequences of states for the photonic mixer device and for the illumination element can yield the same correlation function. For example, a drain function may be defined that represents the charges being directed to the drain gate. Together, the correlation function and the drain function represent how the generated charges are being directed to the different elements with modifiable charge levels and to the gate, e.g., how the generated charges are distributed between the different elements with modifiable charge levels and the drain gate. For example, within a measurement range of the ToF imaging system, integrated values of the charges that are collected by the elements with modifiable charge levels, as distributed according to the correlation function (and the drain function), may be suitable for determining the phase-delay of reflections of the emitted light, e.g., using the well-known arc-tan calculation commonly used in ToF imaging systems. To avoid ambiguity, charges might not be directed towards the gate within the measurement range of the ToF imaging system, as evidenced by the corresponding drain function. For example, a transition interval may be introduced between the measurement range and a "drain range", i.e., a range in which the charges are being directed to the gate, and which is not used for depth measurement. For example, in the subsequently introduced FIGS. 2-4, the first slopes 212; 312 of a first and a second correlation function are identical, as are the first slopes 612; 712 of an inverted first and an inverted second correlation function in FIGS. 6-8, which may prohibit depth measurements, and which may thus be used as transition interval between the drain range and the measurement range. Outside the measurement range, the ratio of the integrated values of the charges that are collected by the elements with modifiable charge levels, as distributed according to the correlation function and the drain function, may be constant, e.g., as charges are directed to the gate instead of the elements with modifiable charge levels, or as the charges are directed equally to the first and second element, or the first and second (and thus also inverted first and inverted second) correlation function may be identical, which may be unsuitable for determining the phase delay, and thus distance.

In various examples of the present disclosure, an output signal of the ToF imaging system may be based on a plurality of measurements that are taken within a pre-defined cycle of measurements. For example, instead of determining the output signal of the ToF imaging system according to a single correlation function, each of the measurement may be taken with a different correlation function. For example, the control circuitry may be configured to provide the control signal according to first sequences of states for the photonic mixer device and the illumination element during a first measurement and according to second sequences of states for the photonic mixer device and the illumination element during a separate second measurement. Similar to the example of a single correlation function, a combination of the first sequences of states for the photonic mixer device and the illumination element may define a first correlation function of the ToF imaging system and a combination of the second sequences of states for the photonic mixer device and the illumination element may define a second correlation function of the ToF imaging system. The ToF imaging system may be configured to perform the first measurement based on the first correlation function, and the second measurement based on the second correlation function. The measurement cycle may comprise both the first and the second measurement. For example, the first correlation function and the second correlation function may be chosen such, that four different phase windows (0°, 90°, 180° and 270°) can be disambiguated in the measurements.

Figure 2:
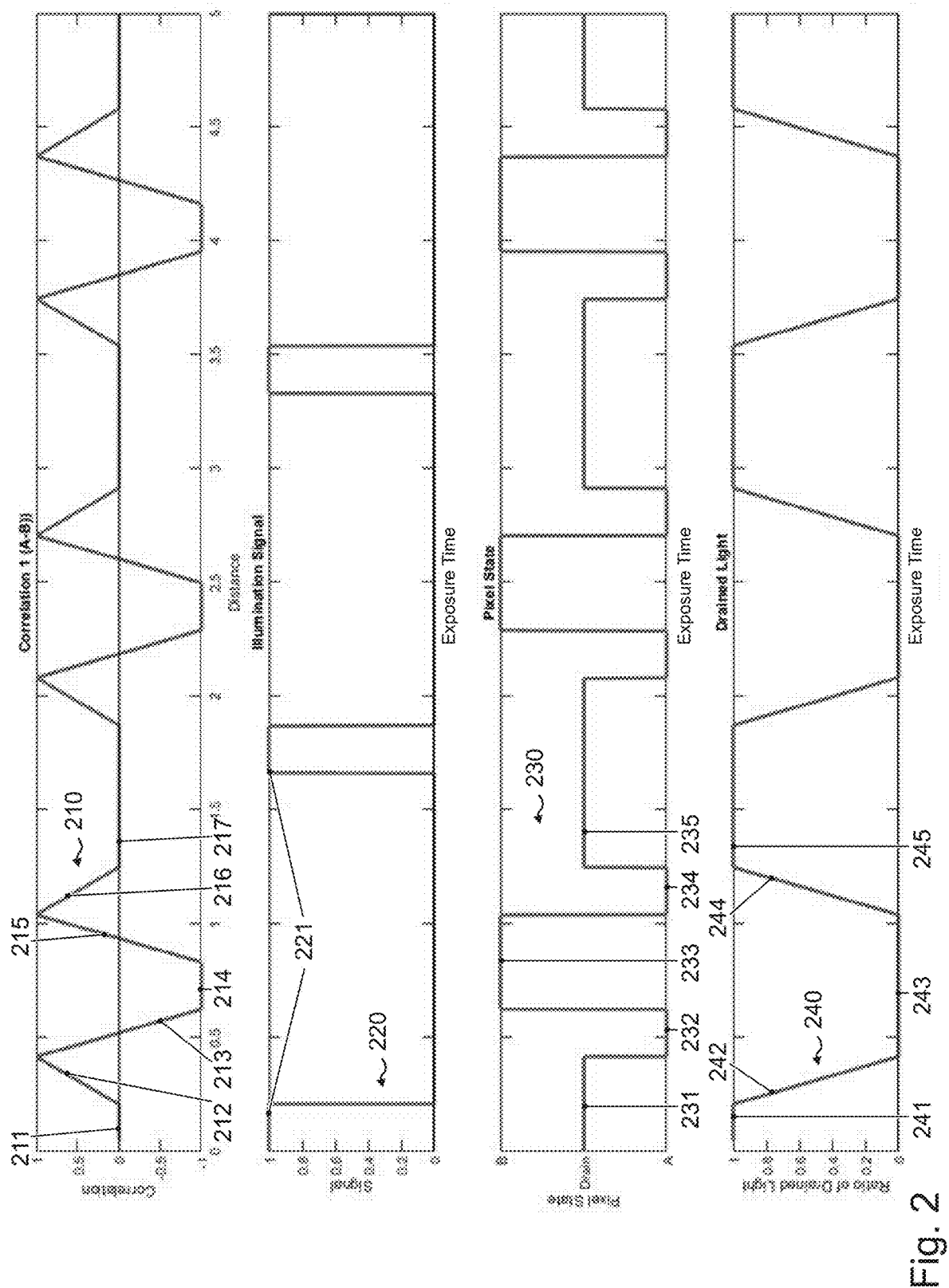
FIG. 2 shows a visualization of an example of a first correlation function and the respective sequences of states used to achieve this correlation function.
Figure 3:
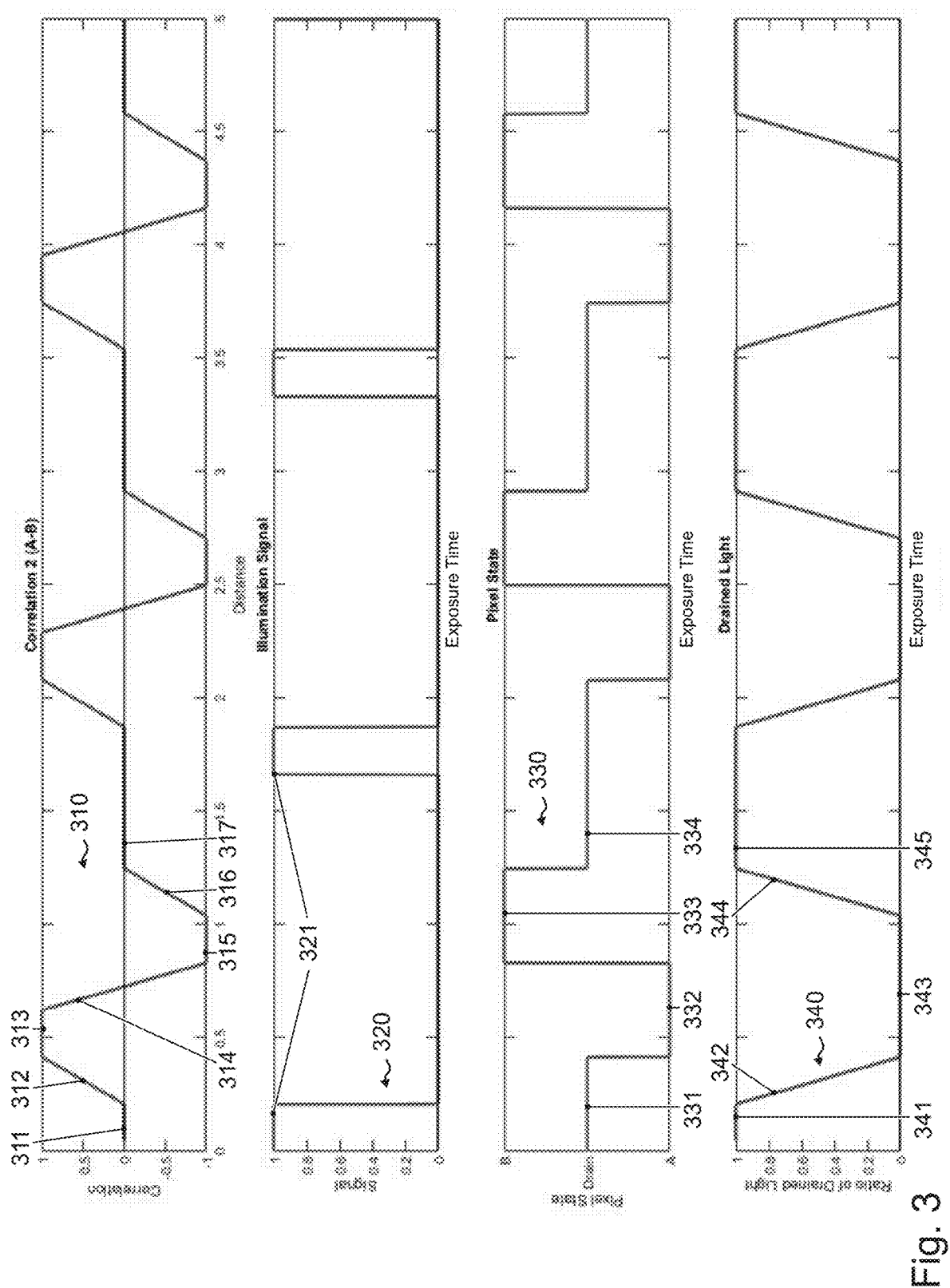
FIG. 3 shows a visualization of an example of a second correlation function and the respective sequences of states used to achieve this correlation function.
Figure 4:
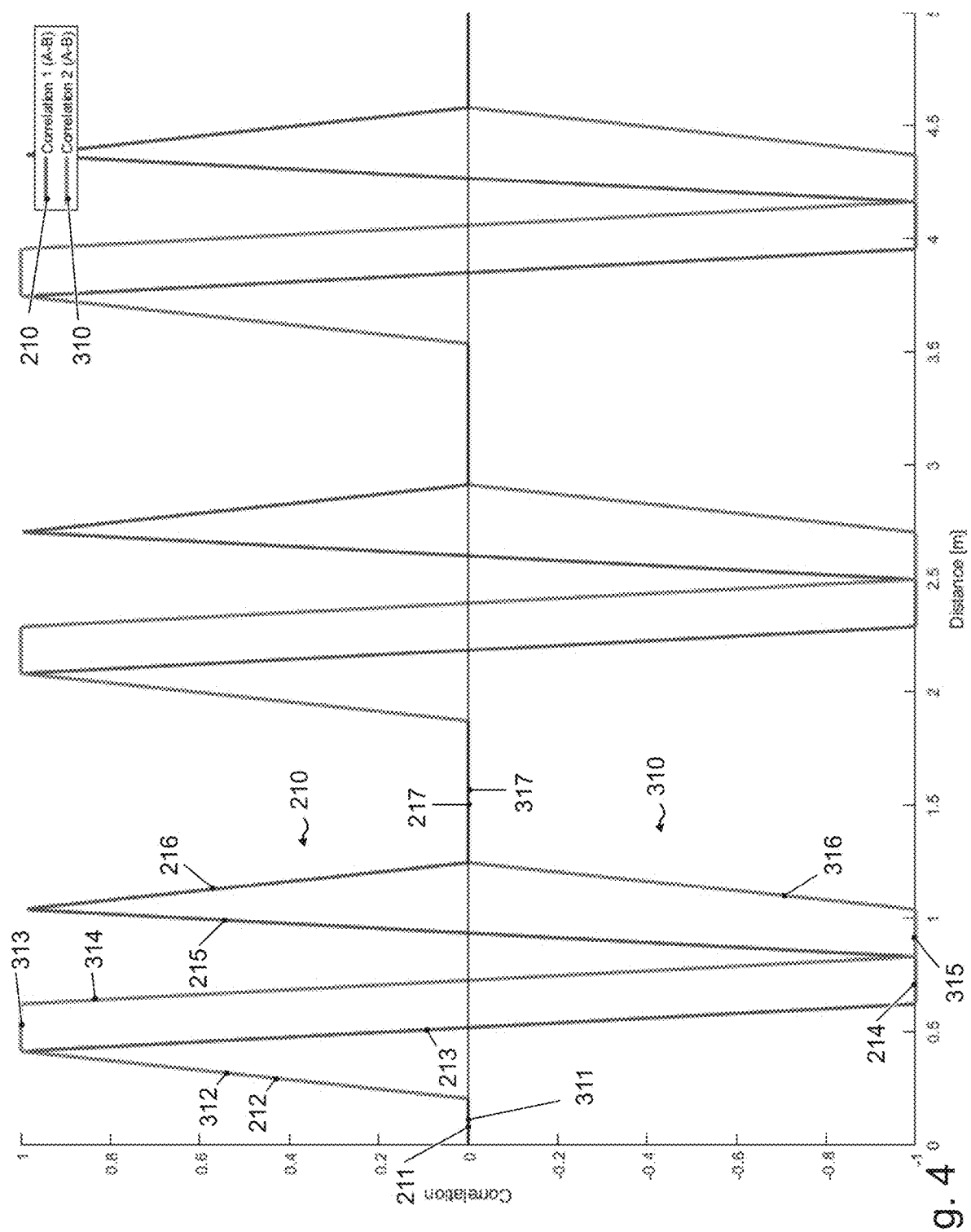
FIG. 4 shows a visualization of the example of the first correlation function and the example of the second correlation function to highlight the relation of both correlation functions to each other.

In FIGS. 2 to 4, examples are given for the first and second correlation function, and for the sequences of states used to obtain the first and second correlation functions. FIG. 2 and FIG. 3 show an example of a specific illumination and sensor/drain control signal design, defined as sequences of states, that can be used to achieve the resulting correlation function. FIG. 4 shows the relation of both correlation functions to each other. The control signal design, and thus the sequences of states and correlation functions, may define the output function, and thus the ability of the present concept to suppress measurements at certain distances.

FIG. 2 shows a visualization of an example of a first correlation function 210 and the respective sequences of states 220; 230 used to achieve this correlation function. The x-axis denotes the distance, while the y-axis denotes the value of the correlation function. In general, the first correlation function and the second correlation function may take values within a normalized value range of [−1; 1]. The value of the correlation functions of FIGS. 2, 3, 6 and 7 is defined by the difference (A-B) between the charges collected in the first element (denoted "A" in FIGS. 2 to 4, 6 to 8) and the charges collected in the second element (denoted "B" in FIGS. 2 to 4, 6 to 8). The correlation function 210 comprises a first portion 211 that is constant at 0, a subsequent second portion 212 that transitions from being constant at 0 to 1, a subsequent third portion 213 that transitions from 1 to −1, a subsequent fourth portion 214 that is constant at −1, a subsequent fifth portion 215 that transitions from −1 to 1, a subsequent sixth portion 216 that transitions from 1 to 0, and a subsequent seventh portion 217 that is constant at 0. This sequence of portions is repeated, with the seventh portion 217 corresponding to, or transitioning into, the first portion of the subsequent repetition.

FIG. 2 further shows an example of a control signal 220 for the illumination system. In FIGS. 2, 3, 6 and 7, in the graphs representing the control signal ("illumination signal") for the illumination element, the control signal ("pixel state") for the photonic mixer device, and the resulting ratio of drained light, the x-axis denotes the exposure time, while the y-axis denotes the state of the respective control signals or the ratio of drained light in the last graph. In general, the exposure time is variable, and the codes are repeated many times. However, the signals 220 to 240 are in the same scale (time-of-flight) as the distance, so that it is evident how the control signals yield the correlation function. The control signal 220 for the illumination element comprises periodic peaks 221 that occur at the beginning of the respective sequence of states of the control signal. The control signal 230 for the photonic mixer device comprises a first portion 231, where the charge carriers are directed to the drain gate, a subsequent second portion 232, where the charge carriers are directed to the first element ("A"), a subsequent third portion 233, where the charge carriers are directed to the second element ("B"), a subsequent fourth portion 234, where the charge carriers are directed to the first element, and a subsequent fifth portion 235, during which the charge carriers are directed to the drain gate. Similar to the correlation function 210, this sequence of portions, or sequence of states, is repeated, with the fifth portion 235 corresponding to, or transitioning into, the first portion of the subsequent repetition. FIG. 2 further shows a graph for the ratio of drained light 240, i.e., the amount of light suppressed per distance, which may correspond to the drain function. The graph 240 comprises a first portion 241, where all of the light is suppressed, a second portion 242, where the graph transitions from all the light being suppressed to none of the light being suppressed, a third portion 243, where none of the light is suppressed, a fourth portion 244, where the graph transitions from none of the light being suppressed to all of the light being suppressed, and a fifth portion 245, where all of the light is suppressed.

FIG. 3 shows a visualization of an example of the second correlation function 310 and the respective sequences of states 320; 330 used to achieve this correlation function. The correlation function 310 comprises a first portion 311 that is constant at 0, a subsequent second portion 312 that transitions from being constant at 0 to 1, a subsequent third portion 313 that is constant at 1, a subsequent fourth portion 314 that transitions from 1 to −1, a subsequent fifth portion 315 that is constant at −1, a subsequent sixth portion 316 that transitions from −1 to 0, and a subsequent seventh portion 317 that is constant at 0. This sequence of portions is repeated, with the seventh portion 317 corresponding to, or transitioning into, the first portion of the subsequent repetition.

FIG. 3 further shows an example of a corresponding control signal 320 for the illumination system. Similar to the control signal for the illumination element of FIG. 2, the control signal 320 for the illumination element comprises periodic peaks 321 that occur at the beginning of the respective sequence of states of the control signal. In the figures, an identical illumination signal is used for all measurements. However, this is not necessary, as the pulses are integrated. In practice, some light pulses may be skipped according to a certain pattern for laser safety reasons. FIG. 3 further shows the control signal 330 for the photonic mixer device, which comprises a first portion 331, where the charge carriers are directed to the drain gate, a subsequent second portion 332, where the charge carriers are directed to the first element ("A"), a subsequent third portion 333, where the charge carriers are directed to the second element ("B"), and a subsequent fourth portion 334, during which the charge carriers are directed to the drain gate. FIG. 3 further shows a graph for the ratio of drained light 340, i.e., the amount of light suppressed per distance, which may correspond to the drain function. The graph 340 corresponds to graph 240 of FIG. 2, with portions 341-345 corresponding to portions 241-245 of FIG. 2.

As can be seen in a comparison between the correlation functions 210; 310 and the ratio 240; 340 of the suppressed light, when the values of the first correlation function and the second correlation function transition from being constant at 0 to 1 and −1, respectively, such as at portions 212; 312 of the first and second correlation function, a portion of the charges is directed to the gate, as shown at portions 242; 342 of the graphs 240; 340. When the values of the first correlation function and the second correlation function transition between −1 and 1, e.g., at portions 213; 215 of the first correlation function 210 and at portion 314 of the second correlation function, the charges are directed to the first element or to the second element. When the values of the first correlation function and second correlation function are constant at −1 or 1, e.g., at portion 214 of the first correlation function and portions 313; 315 of the second correlation function, the charges are also directed to the first element or to the second element.

FIG. 4 shows a visualization of the first correlation function 210 and the second correlation function 310 to highlight the relation of both correlation functions to each other. In FIG. 4, the first correlation function 210 and the second correlation function 310 are superimposed over each other, with the portions shown in connection with FIGS. 2 and 3 being annotated as well. As can be seen in FIG. 4, in some portions of the graph, at least one of the correlation functions is changing over distance. If at least one of the correlation functions is changing, a (mathematical) combination of the correlation functions, such as a multiplication or division, is changing as well. In FIG. 4, this is the case for portions 212-216 of the first correlation function 210 and portions 312 to 316 of the second correlation function 310. These portions of the correlation functions can be used to perform distance measurements. In other words, a measurement range of the ToF imaging system is defined by the combination of the correlation functions, with the measurement range being set to a distance range in which at least one of the correlation functions is changing over distance (and the correlation functions are not transitioning in opposing directions). Inside the measurement range, any method, such as the well-known arctan method, may be used to determine the distance based on the first and second correlation function.

Outside the measurement range, the combination of the correlation functions may be constant (e.g., at 0), or undefined. In other words, the combination of the first correlation function and the second correlation function may be continuously changing for the measurement range of the ToF imaging system, and constant or undefined outside the measurement range. For example, the combination of the correlation functions may be undefined if the correlation functions are combined using a division operation, e.g., if the value of one of the correlation functions is divided by the value of the other correlation function. If the value of the divisor correlation function is 0, then the combination of the correlation function may be undefined.

In the context of the present disclosure, the portions of the combination of the correlation functions that are constant or undefined may be used to suppress measurements at these distances. For example, a portion of the combination of the first correlation function and the second correlation function that is constant or undefined may occur when both the first correlation function and the second correlation function yield values that are constant at 0 (see portions 217; 317 of the first and second correlation function) or when the first and second correlation function are transitioning in opposing directions (not shown). Therefore, the correlation functions may be designed such, that each of the correlation functions comprises a portion that is constant (e.g., at 0), or such that the correlation functions comprise a portion where the first and second correlation function are transitioning in opposite directions. For example, the correlation function or correlation functions, such as the first correlation function and the second correlation function, and, as described in connection with FIGS. 6 to 8, the inversion of the first correlation function and the inversion of the second correlation function, may comprise at least one constant portion that is constant at 0. In particular, the correlation function or correlation functions may comprise at least one constant portion that coincides with the charge carriers being directed to the gate or with the charge carriers being directed equally to the first element and to the second element. These constant portions may be at the same position in both correlation functions (or all four correlation functions), such that the combination of the correlation functions is also constant (or undefined) at that position. For example, a portion of the combination of the first correlation function and the second correlation function that is constant or undefined may coincide with the charge carriers being directed to the gate or with the charge carriers being directed equally to the first element and to the second element. Consequently, the measurement range may be (purposefully) limited using the drain gate.

Figure 5A:
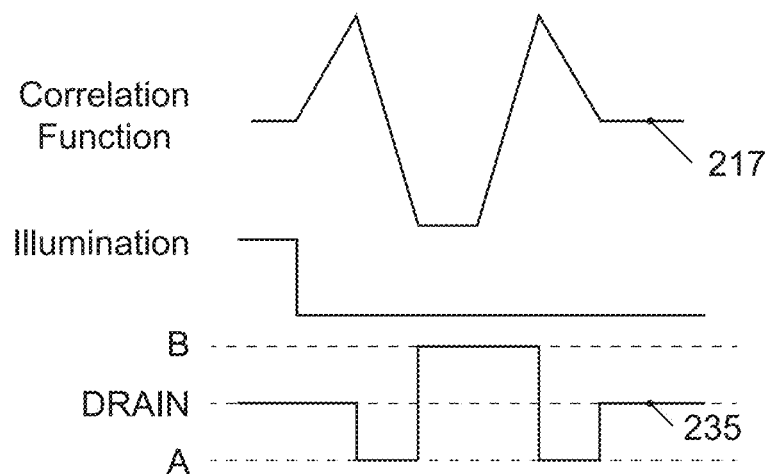
FIGS. 5a and 5b show different control signals that yield a constant portion of a correlation function.
Figure 5B:
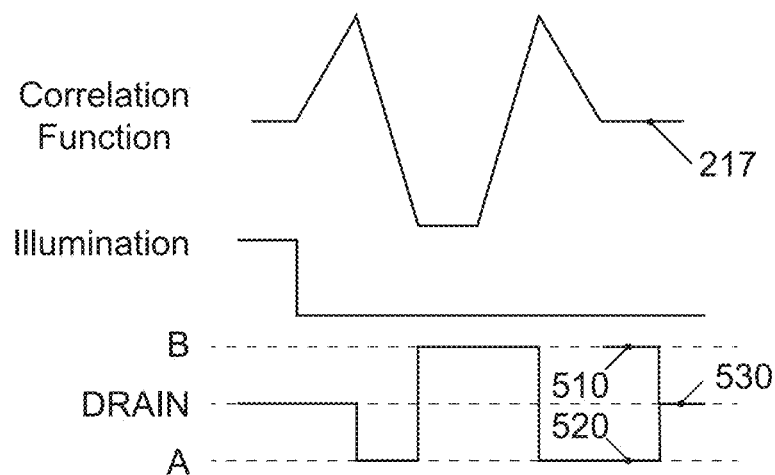

In FIGS. 5a and 5b, the two options for generating a portion that is constant at 0 are illustrated. FIGS. 5a and 5b show different control signals that yield a constant portion of a correlation function. In FIG. 5a, the sequence of states and the correlation function of FIG. 2 are shown. In this case, the charge carriers being directed to drain (in portion 235 of the control signal for the photonic mixer device) leads to the constant portion 217 of the first correlation function. As shown in FIG. 5b, the same affect (or at least a similar effect) can be obtained by directing the charge carriers equally to the first and second element, as triggered by portion 510; 520 of the control signal for the photonic mixer device. In this case, the photonic mixer device is set to a dedicated state, where modulation gates being used to control the flow of charge carriers to the first and second element are both set to high. At portion 530 of the control signal for the photonic mixer device in FIG. 5b, the charge carriers are directed to the gate, which has the same effect, as the correlation function remains constant at 0.

Figure 6:
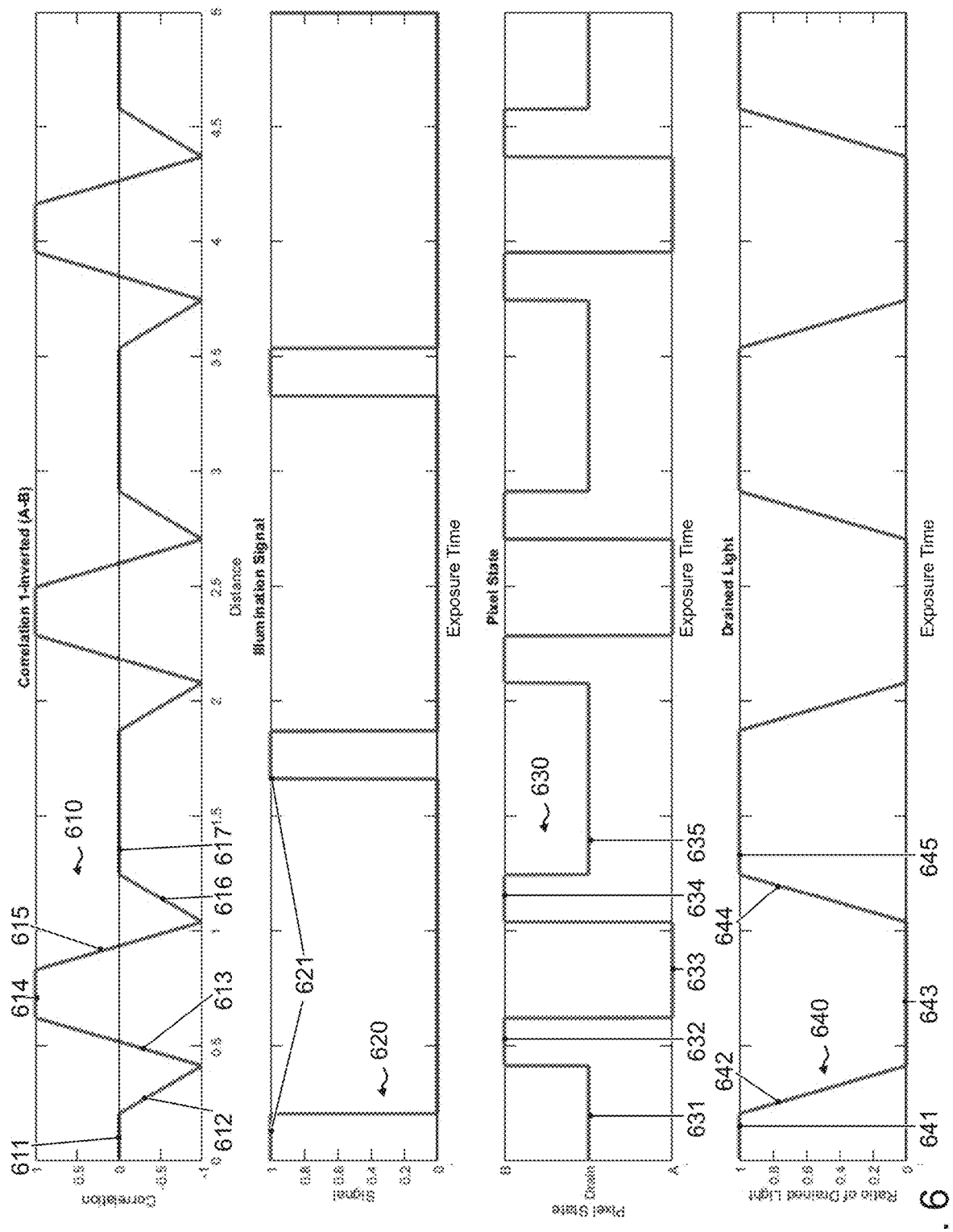
FIG. 6 shows a visualization of an inversion of the example of the first correlation function and the respective sequences of states used to achieve this correlation function.
Figure 7:
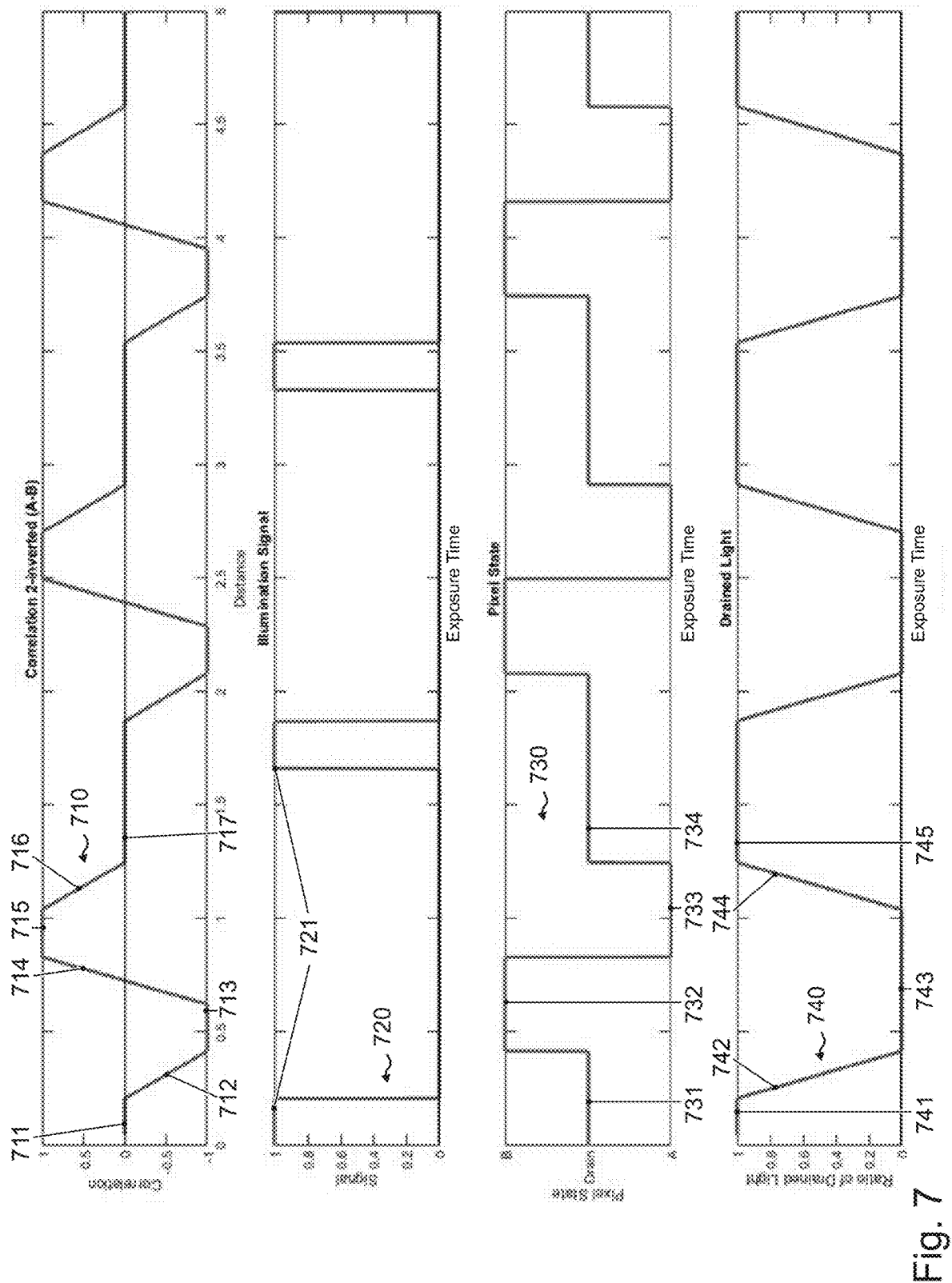
FIG. 7 shows a visualization of an inversion of the example of the second correlation function and the respective sequences of states used to achieve this correlation function.

In some examples, in addition to the first correlation function and the second correlation function, inverted versions of the first correlation function and of the second correlation function may be measured, and subtracted from their non-inverted counterparts to mitigate, e.g., reduce or correct, offset errors. For example, the control circuitry may be configured to provide the control signal according to third sequences of states for the photonic mixer device and the illumination element during a separate third measurement and according to fourth sequences of states for the photonic mixer device and the illumination element during a separate fourth measurement. A combination of the third sequences of states for the photonic mixer device and the illumination element may define an inverse of the first correlation function and a combination of the fourth sequences of states for the photonic mixer device and the illumination element may define an inverse of the second correlation function of the ToF imaging system. For example, the third sequence of state for the photonic mixer device may be the inverse to the first sequence of state for the photonic mixer device, and the fourth sequence of state for the photonic mixer device may be the inverse to the second sequence of state for the photonic mixer device. In this context, in the inverse of a sequence for the photonic mixer device, the first element and the second element may be swapped compared to the non-inverted sequence. In various examples, e.g., as shown in FIGS. 6 and 7, the sequences of states for the illumination element may be the same for the inverted and non-inverted correlation function. For example, the third sequence of states for the illumination element may correspond to the first sequence of states for the illumination element, and the fourth sequence of states for the illumination element may correspond to the second sequence of states for the illumination element. However, the sequences of states for the photonic mixer device and the illumination element may be chosen differently, as long as the resulting correlation functions are inverted relative to the non-inverted correlation functions.

The inverted signals, i.e., the signals that are inverted relative to the signals shown in FIGS. 2 to 4, are as shown in FIG. 6 and FIG. 7 (this is the equivalent to 0° and 180° phase in continuous-wave time-of-flight imaging).

FIG. 6 shows a visualization of an example of a correlation function 610, which is the inversion of the first correlation function 210, and the respective control signals used to achieve this correlation function. Similar to the first correlation function and the second correlation function, the inversion of the first correlation function and the inversion of the second correlation function may take values within a normalized value range of [−1; 1]. The correlation function 610 comprises a first portion 611 that is constant at 0, a subsequent second portion 612 that transitions from being constant at 0 to −1, a subsequent third portion 613 that transitions from −1 to 1, a subsequent fourth portion 614 that is constant 1, a subsequent fifth portion 615 that transitions from 1 to −1, a subsequent sixth portion 616 that transitions from −1 to 0, and a subsequent seventh portion 617 that is constant at 0. This sequence of portions is repeated, with the seventh portion 617 corresponding to, or transitioning into, the first portion of the subsequent repetition.

FIG. 6 further shows an example of a control signal 620 for the illumination system. The control signal 620 for the illumination system used to generate the inversion of the first correlation function corresponds to the control signal 220 used to generate the first correlation function. The control signal 620 for the illumination element comprises periodic peaks 621 that occur at the beginning of the respective sequence of states of the control signal. FIG. 6 further shows the control signal 630 for the photonic mixer device, which comprises a first portion 631, where the charge carriers are directed to the drain gate, a subsequent second portion 632, where the charge carriers are directed to the second element ("B") (instead of the first element, as in portion 232 of FIG. 2), a subsequent third portion 633, where the charge carriers are directed to the first element ("A") (instead of the second element, as in portion 233 of FIG. 2), a subsequent fourth portion 634, where the charge carriers are directed to the first element (instead of the second element, as in portion 234 of FIG. 2), and a subsequent fifth portion 635, during which the charge carriers are directed to the drain gate. Similar to the correlation function 610, this sequence of portions, or sequence of states, is repeated, with the fifth portion 635 corresponding to, or transitioning into, the first portion of the subsequent repetition. FIG. 6 further shows a graph for the ratio of drained light 640, i.e., the amount of light suppressed per distance, which may correspond to the drain function. The graph 640 corresponds to graph 240 of FIG. 2, with portions 641-645 corresponding to portions 241-245 of FIG. 2.

FIG. 7 shows a visualization of an example of a correlation function 710, which is the inversion of the second correlation function 310, and the respective control signals used to achieve this correlation function. The correlation function 710 comprises a first portion 711 that is constant at 0, a subsequent second portion 712 that transitions from being constant at 0 to −1, a subsequent third portion 713 that is constant at −1, a subsequent fourth portion 714 that transitions from −1 to 1, a subsequent fifth portion 715 that is constant at 1, a subsequent sixth portion 716 that transitions from 1 to 0, and a subsequent seventh portion 717 that is constant at 0. This sequence of portions is repeated, with the seventh portion 717 corresponding to, or transitioning into, the first portion of the subsequent repetition.

FIG. 7 further shows an example of a corresponding control signal 720 for the illumination system. The control signal 720 for the illumination system used to generate the inversion of the second correlation function corresponds to the control signal 320 used to generate the second correlation function. The control signal 720 for the illumination element comprises periodic peaks 721 that occur at the beginning of the respective sequence of states of the control signal. FIG. 7 further shows the control signal 730 for the photonic mixer device, which comprises a first portion 731, where the charge carriers are directed to the drain gate, a subsequent second portion 732, where the charge carriers are directed to the second element ("B") (instead of the first element, as in portion 332 of FIG. 3), a subsequent third portion 733, where the charge carriers are directed to the first element ("A") (instead of the second element, as in portion 333 of FIG. 3), and a subsequent fourth portion 734, during which the charge carriers are directed to the drain gate. FIG. 7 further shows a graph for the ratio of drained light 740, i.e., the amount of light suppressed per distance, which may correspond to the drain function. The graph 740 corresponds to graph 240 of FIG. 2, with portions 741-745 corresponding to portions 241-245 of FIG. 2.

Figure 8:
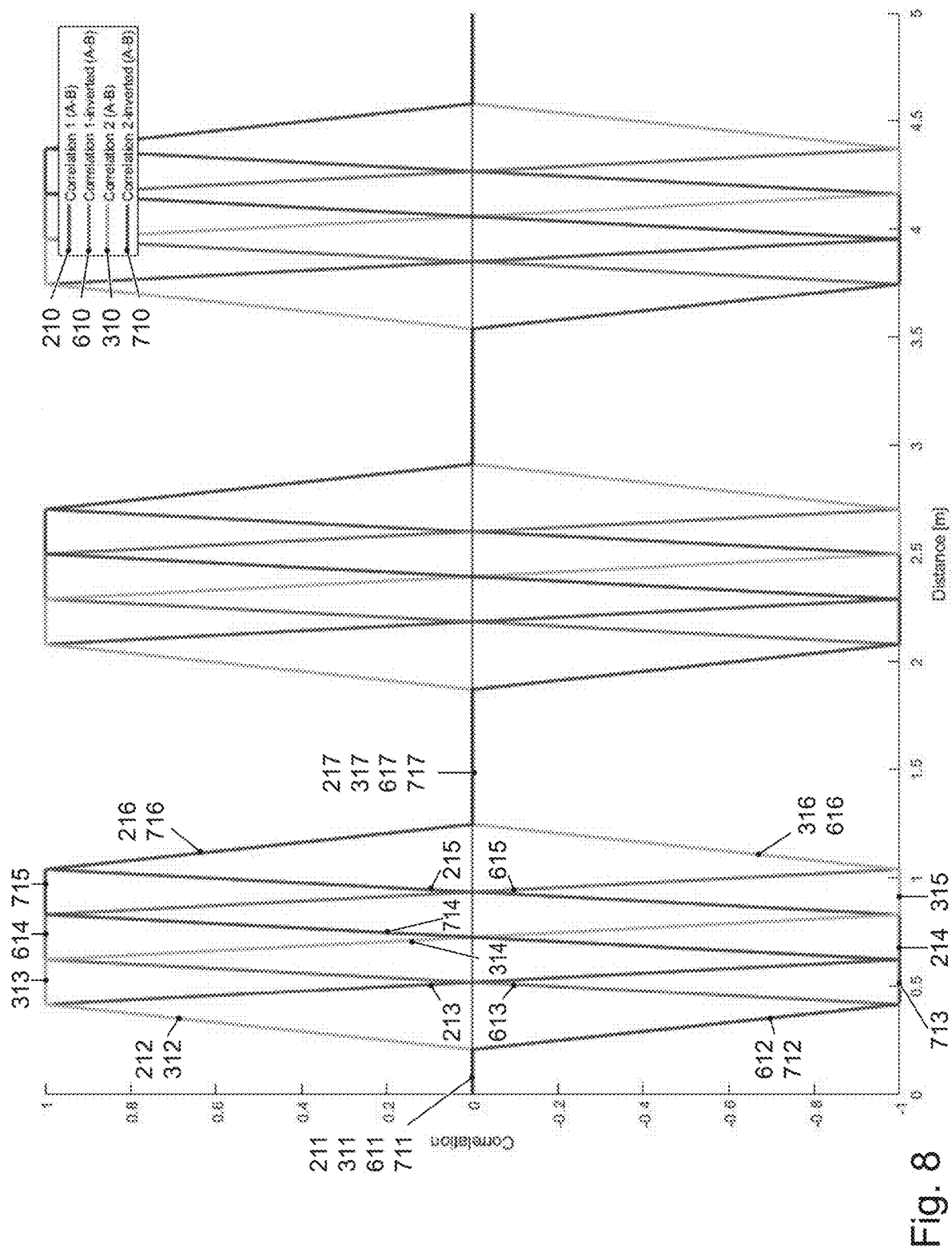
FIG. 8 shows a visualization of the example of the first correlation function and the second correlation function and their inversions, to highlight the relation of all four correlation functions to each other.

FIG. 8 shows a visualization of the example of the first correlation function and the second correlation function and their inversions, to highlight the relation of all four correlation functions to each other. In FIG. 4, the first correlation function 210, the second correlation function 310, the inversion of the first correlation function 610 and the inversion of the second correlation function 710 are superimposed over each other, with the correlation function portions shown in connection with FIGS. 2, 3, 6 and 7 being annotated as well.

Figure 9:
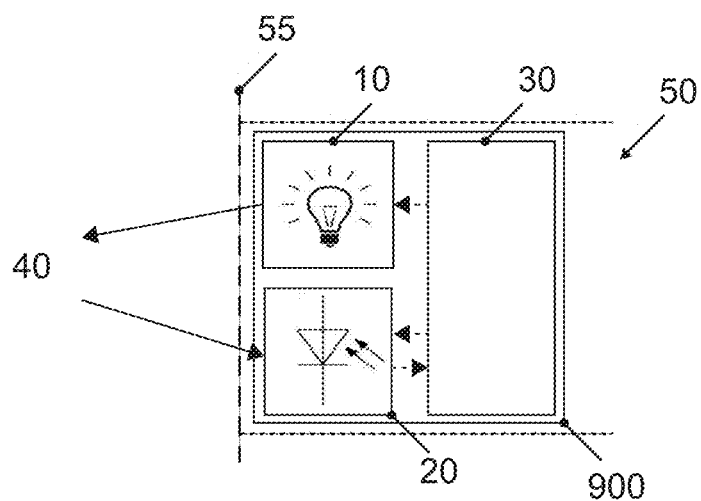
FIG. 9 shows a schematic diagram of a ToF imaging system that is arranged in a cavity.

As is evident from the above illustrations, the measurement range of the ToF imaging system can be (precisely) controlled by introducing constant (or undefined) portions into the correlations and corresponding combinations of correlation functions. Thus, the measurement range may be set to exclude a depth range to be disregarded (i.e., suppressed), in order to suppress ToF measurements in this depth range. The control signal may be generated such, that the measurement range of the correlation function or correlation functions is adapted to suppress the depth range to be disregarded. The control signal may be generated such, that charge carriers generated based on reflections from the depth range to be disregarded are directed to the drain gate (or equally to the first and second element), and are thus suppressed from the depth measurement. In other words, the control signals may be generated such, that, at the depth range to be disregarded, the correlation functions yield a value of 0. For example, the control signal may be time-shifted to achieve a zero correlation at the depth to be suppressed. For example, the control circuitry may be configured to adapt (e.g., shift) a position of the at least one constant or undefined portion (of the combination of correlation functions) based on a distance of an object 55 (as shown in FIG. 9) to be disregarded in a distance measurement from the ToF imaging system. Accordingly, the method shown in FIG. 1b may further comprise adapting 120 the position of the at least one constant or undefined portion based on the distance of the object to be disregarded. For example, the distance of the object 55, and thus the depth to be suppressed may be determined previously by a conventional depth measurement, or may be pre-defined, if reflections at a pre-defined range are to be suppressed. Various examples of the present disclosure may thus provide a specific control signal with sequences of states that are designed to suppress selected regions of the scene (depth wise), while retaining the option to use the fast arctan calculation for depth estimation in the non-suppressed regions.

In some cases, the depth range to be suppressed may be large, e.g., in order to account for objects that move within the depth range, and which are to be disregarded in the measurements. In this case, the constant portions of the correlations, and the constant or undefined portions of the combination of correlations, may be elongated to extend the depth range being suppressed. For example, referring to the control signals shown in connection with FIGS. 2, 3, 6 and 7, the last state in all sequences of states (no illumination, pixel in drain state) may be repeated for one or more times to elongate the distance in which no correlation occurs (as the correlations are all zero).

In some examples, the ToF imaging system may be integrated within a mobile device, such as a smartphone. For example, the ToF imaging system may be used to scan a face of a user of the mobile device, to enable face authentication supported by depth-sensing. The user-facing surface of such mobile devices are often made of cover glass, which may cover all or most of the user-facing surface of the mobile device. Behind the cover glass, a display of the mobile device may be arranged, or the display may form a unit with the cover glass. The proposed concept may be used to suppress reflections of the display and cover glass, so the ToF imaging system can be arranged in a cavity behind the display.

FIG. 9 shows a schematic diagram of a ToF imaging system 900 that is arranged in a cavity 50 of a smartphone, the cavity being covered by a display 55 of the smartphone. For example, the illumination element 10 and the photonic mixer device 20 may be located in the common cavity 50 that is covered by the display 55. As mentioned above, the display may be the object to be disregarded in the distance measurement. In other words, a depth range, in which a cover glass, such as the smartphone display, is placed may be suppressed. In this case, the correlation may start to rise immediately after the display. Also, as the distance between the illumination element or the photonic mixer device is very small, the charges generated directly after emitting the light pulse may be directed to the drain. As shown in FIGS. 2 to 4, 6 to 8, the control signal may be configured such that an activation of the illumination element coincides with the charges being directed to the gate, e.g., so the charges generated based in reflections that occur at the display or cover glass are directed towards the drain gate.

In various examples, the control circuitry may be configured to provide an output signal based on a combination of an output of the first element and an output of the second element. Accordingly, the method shown in FIG. 1b may further comprise providing 130 the output signal based on the output of the first element and the output of the second element. As mentioned above, the ToF system may be configured to perform multiple measurements in a measurement cycle. For example, the measurement cycle may comprise the first and the second measurement, and further optionally the third and fourth measurement. These measurements may be taken separately, based on different correlation functions (e.g., the first, second, inverted first and inverted second correlation function), i.e. with the charges being collected during the measurements being distributed according to different correlation functions. Consequently, the control circuitry may be configured to provide the output signal based on the combination of the output of the first element and of the second element, as measured in the first and second measurement, or as measured in the first, second, third and fourth measurement. Furthermore, as the different measurements are taken based on different correlation functions, the output signal may be based on one or more correlation functions of the ToF imaging system, e.g., based on the first and second correlation function, or based on the first, second, inverted first and inverted second correlation function. While the measurements are denoted "first", "second", and further optionally "third" and "fourth" measurements, they may be taken in any order within the measurement cycle. An output signal of the ToF imaging system may be provided based on (all of) the measurements performed in the measurement cycle, e.g., based on the first and second measurement, or based on the first, second, third and fourth measurement.

For example, the first and second measurement may suffice for performing depth measurements of objects. For example, the charge levels collected in the first and second element in the first and second measurement may be used to determine the charges received in different phase windows. For example, the first measurement may be used to determine the charges received in the 0° phase window, and the second measurement may be used to determine the charges received in the 90° phase window. A depth estimate may be derived from the charges received in the 0° and 90° phase windows. Optionally, additional measurements may be taken to determine the charges received in the 180° and 270° phase windows. The collected charges may be integrated, and based on the ratio between the charges collected in the different phase windows, the phase-delay may be calculated, which may be indicative of a distance of one or more objects 40 from the ToF imaging system for objects within the measurement range of the ToF imaging system. Consequently, the output signal may be indicative of the distance of the one or more objects 40 from the ToF imaging system for objects within the measurement range of the ToF imaging system. Reflections off objects outside the measurement range may be suppressed according to the correlation functions, and thus disregarded in the output. Using the phase delay and the speed of light, the distance between the ToF imaging sensor and the one or more objects the light is reflected off may be calculated. For example, the output signal may comprise information on the charges collected in the four phase windows, or the output signal may comprise information on the phase delay. In the former case, the control circuitry may be configured to integrate the charges collected in the four phase windows, and to generate the information on the charges collected in the four phase windows based on the integration of the charges. In the latter case, the control circuitry may be additionally configured to calculate the phase delay based on the information on the charges collected in the four phase windows, e.g., using the arctan method mentioned above.

In some examples, as mentioned above, in addition to the first measurement and the second measurement that are based on the first and second correlation function, the output signal may further be based on the inverse of the first and second correlation function, i.e., the third measurement and the fourth measurement. For example, the charge levels collected in the third and fourth measurement may be used to reduce or correct offset errors that are inherent to the first, second, third and fourth measurement. For example, as shown in connection with FIGS. 2, 3, 6 and 7, the control circuitry may be configured to determine a difference (A-B) between the charge level of charges collected in the first element (bucket "A") and the charge level of charges collected in the second element (bucket "B"). Due to the inversion of the correlation function, the measurements (A-B) taken based on the first and second correlation function should be the inverse of the measurements (A-B) taken based on the inverted first and inverted second correlation function. The difference between those measurements may correspond to the offset error, which may be subtracted from the measurements taken based on the first and second correlation function. In other words, the control circuitry may be configured to reduce the offset error based on the first, second, third and fourth measurement. The control circuitry may be configured to provide the output signal based on the first, second, third and fourth measurement.

Alternatively or additionally to the subtraction of the values of the inverted correlation functions, a dark image, i.e., an image recorded without active illumination by the illumination element may be subtracted from the first correlation and second correlation to correct offset errors.

The proposed concept provides a ToF imaging system with photo-sensitive elements with a third terminal, and a specific illumination and sensor/drain control signal design to suppress selected regions of the scene (depth wise), while being able to calculate the distance in non-suppressed regions. The proposed concept may, in particular, be used with under-display ToF imaging systems and methods.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

The examples as described herein may be summarized as follows:

Various examples relate to a ToF imaging system comprising a photonic mixer device for performing ToF measurements using at least one photo-sensitive element. Each photo-sensitive element comprises at least a first element with a modifiable first charge level, a second element with a modifiable second charge level, and a gate for transferring charges to a fixed potential. The ToF imaging device comprises control circuitry configured to provide a control signal for the photonic mixer device. The control signal is configured to drive the at least one photo-sensitive element such that charge carriers generated in the photo-sensitive elements by received light are directed either to the first element, the second element or the gate, or such that charge carriers generated in the photo-sensitive elements by received light are directed either to the first element, the second element, the gate, or to the first and the second element.

In various examples, the ToF imaging system comprises an illumination element. The control signal may be further configured to control the illumination element.

For example, the control signal is configured such that an activation of the illumination element coincides with the charges being directed to the gate.

In some examples, the control circuitry is configured to generate the control signal for the photonic mixer device according to a sequence of states for the photonic mixer device. Each state of the sequence of states for the photonic mixer device may define which of the first element, the second element, and the gate the charge carriers are directed to. The control circuitry may be configured to generate the control signal for the illumination element according to a sequence of states for the illumination element, with each state of the sequence of states for the illumination element defining whether the illumination system is activated.

For example, a combination of a sequence of states for the photonic mixer device and a sequence of states for the illumination element may define a correlation function of the ToF imaging system.

In various examples, the control circuitry is configured to provide the control signal according to first sequences of states for the photonic mixer device and the illumination element during a first measurement and according to second sequences of states for the photonic mixer device and the illumination element during a separate second measurement. A combination of the first sequences of states for the photonic mixer device and the illumination element may define a first correlation function and a combination of the second sequences of states for the photonic mixer device and the illumination element may define a second correlation function of the ToF imaging system.

According to some examples, a combination of the first correlation function and the second correlation function is continuously changing for a measurement range of the ToF imaging system and constant or undefined outside the measurement range.

For example, a portion of the combination of the first correlation function and the second correlation function that is constant or undefined may coincide with the charge carriers being directed to the gate or with the charge carriers being directed equally to the first element and to the second element.

According to various examples, the first correlation function and the second correlation function may take values within a normalized value range of [−1; 1]. A portion of the combination of the first correlation function and the second correlation function that is constant or undefined may occur when both the first correlation function and the second correlation function yield values that are constant at 0 or transitioning in opposite directions. When the values of the first correlation function and the second correlation function transition from being constant at 0 to 1 and −1, respectively, a portion of the charges may be directed to the gate. When the values of the first correlation function and the second correlation function transition between −1 and 1, the charges may be directed to the first element or to the second element.

In some examples, the control circuitry is configured to provide the control signal according to third sequences of states for the photonic mixer device and the illumination element during a separate third measurement and according to fourth sequences of states for the photonic mixer device and the illumination element during a separate fourth measurement. A combination of the third sequences of states for the photonic mixer device and the illumination element may define an inverse of the first correlation function and a combination of the fourth sequences of states for the photonic mixer device and the illumination element may define an inverse of the second correlation function of the ToF imaging system.

According to various examples, the correlation function or correlation functions comprise at least one constant portion that coincides with the charge carriers being directed to the gate or with the charge carriers being directed equally to the first element and to the second element.

In some examples, the control circuitry is configured to adapt a position of the at least one constant or undefined portion based on a distance of an object to be disregarded in a distance measurement from the ToF imaging system.

For example, an/the illumination element and the photonic mixer device may be located in a common cavity that is covered by a display. The display may be the object to be disregarded in the distance measurement.

The control circuitry may be configured to provide an output signal based on a combination of an output of the first element and an output of the second element, for example.

In various examples, the output is based on one or more correlation functions of the ToF imaging system.

According to some examples, the received light comprises light that is reflected off one or more objects, with the output signal being indicative of a distance of the objects from the ToF imaging system for objects within a measurement range of the ToF imaging system.

Various examples of the present disclosure relate to a method for operating a Time of Flight, ToF, imaging system comprising a photonic mixer device for performing ToF measurements using at least one photo-sensitive element. Each photo-sensitive element comprises at least a first element with a modifiable first charge level, a second element with a modifiable second charge level, and a gate for transferring charges to a fixed potential. The method comprises providing a control signal for the photonic mixer device. The control signal is configured to drive the at least one photo-sensitive element such that charge carriers generated in the photo-sensitive elements by received light are directed either to the first element, the second element or the gate, or such that charge carriers generated in the photo-sensitive elements by received light are directed either to the first element, the second element, the gate, or to the first and the second element.

Various examples of the present disclosure relate to a computer program with a program code for performing the above method when the computer program is executed on a processor.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A time-of-flight (ToF) imaging system, comprising:
    a photonic mixer device configured to perform ToF measurements using at least one photo-sensitive element, each photo-sensitive element comprising at least a first element with a modifiable first charge level, a second element with a modifiable second charge level, and a gate configured to transfer charges to a fixed potential; and
    control circuitry configured to provide a control signal for the photonic mixer device, the control signal being configured to drive the at least one photo-sensitive element such that charge carriers generated in the at least one photo-sensitive element by received light are directed either to the first element, the second element or the gate, or such that charge carriers generated in the at least one photo-sensitive element by received light are directed either to the first element, the second element, the gate, or to the first element and the second element.

2. The ToF imaging system of claim 1, further comprising an illumination element, wherein the control signal is further configured to control the illumination element.

3. The ToF imaging system of claim 2, wherein the control signal is configured such that an activation of the illumination element coincides with the charge carriers being directed to the gate.

4. The ToF imaging system of claim 2, wherein the control circuitry is configured to generate the control signal for the photonic mixer device according to a sequence of states for the photonic mixer device, each state of the sequence of states for the photonic mixer device defining which of the first element, the second element, and the gate the charge carriers are directed to, and to generate the control signal for the illumination element according to a sequence of states for the illumination element, each state of the sequence of states for the illumination element defining whether the illumination system is activated.

5. The ToF imaging system of claim 4, wherein a combination of a sequence of states for the photonic mixer device and a sequence of states for the illumination element define a correlation function of the ToF imaging system.

6. The ToF imaging system of claim 4, wherein the control circuitry is configured to provide the control signal according to first sequences of states for the photonic mixer device and the illumination element during a first measurement and according to second sequences of states for the photonic mixer device and the illumination element during a separate second measurement, and wherein a combination of the first sequences of states for the photonic mixer device and the illumination element define a first correlation function and a combination of the second sequences of states for the photonic mixer device and the illumination element define a second correlation function of the ToF imaging system.

7. The ToF imaging system of claim 6, wherein a combination of the first correlation function and the second correlation function is continuously changing for a measurement range of the ToF imaging system and constant or undefined outside the measurement range.

8. The ToF imaging system of claim 7, wherein a portion of the combination of the first correlation function and the second correlation function that is constant or undefined coincides with the charge carriers being directed to the gate or with the charge carriers being directed equally to the first element and to the second element.

9. The ToF imaging system of claim 7, wherein the first correlation function and the second correlation function take values within a normalized value range of [−1; 1], wherein a portion of the combination of the first correlation function and the second correlation function that is constant or undefined occurs when both the first correlation function and the second correlation function yield values that are constant at 0 or transitioning in opposite directions, wherein when the values of the first correlation function and the second correlation function transition from being constant at 0 to 1 and −1, respectively, a portion of the charges is directed to the gate, and wherein when the values of the first correlation function and the second correlation function transition between −1 and 1, the charges are directed to the first element or to the second element.

10. The ToF imaging system of claim 6, wherein the control circuitry is configured to provide the control signal according to third sequences of states for the photonic mixer device and the illumination element during a separate third measurement and according to fourth sequences of states for the photonic mixer device and the illumination element during a separate fourth measurement, and wherein a combination of the third sequences of states for the photonic mixer device and the illumination element define an inverse of the first correlation function and a combination of the fourth sequences of states for the photonic mixer device and the illumination element define an inverse of the second correlation function of the ToF imaging system.

11. The ToF imaging system of claim 5, wherein the correlation function or correlation functions comprise at least one constant portion that coincides with the charge carriers being directed to the gate or with the charge carriers being directed equally to the first element and to the second element.

12. The ToF imaging system of claim 7, wherein the control circuitry is configured to adapt a position of the at least one constant or undefined portion based on a distance of an object to be disregarded in a distance measurement from the ToF imaging system.

13. The ToF imaging system of claim 1, wherein the control circuitry is configured to provide an output signal based on a combination of an output of the first element and an output of the second element.

14. A method for operating a time-of-flight (ToF) imaging system that includes a photonic mixer device configured to perform ToF measurements using at least one photo-sensitive element, each photo-sensitive element comprising at least a first element with a modifiable first charge level, a second element with a modifiable second charge level, and a gate configured to transfer charges to a fixed potential, the method comprising:
  providing a control signal for the photonic mixer device, the control signal being configured to drive the at least one photo-sensitive element such that charge carriers generated in the at least one photo-sensitive element by received light are directed either to the first element, the second element or the gate, or such that charge carriers generated in the at least one photo-sensitive element by received light are directed either to the first element, the second element, the gate, or to the first and the second element.

15. A computer program product comprising a non-transitory computer readable medium storing a computer program for operating a time-of-flight (ToF) imaging system that includes a photonic mixer device configured to perform ToF measurements using at least one photo-sensitive element, each photo-sensitive element comprising at least a first element with a modifiable first charge level, a second element with a modifiable second charge level, and a gate configured to transfer charges to a fixed potential, the computer program comprising:
  program instructions to provide a control signal for the photonic mixer device, the control signal being configured to drive the at least one photo-sensitive element such that charge carriers generated in the at least one photo-sensitive element by received light are directed either to the first element, the second element or the gate, or such that charge carriers generated in the at least one photo-sensitive element by received light are directed either to the first element, the second element, the gate, or to the first and the second element.

* * * * *